United States Patent [19]

Schmidt et al.

[11] 4,315,125
[45] Feb. 9, 1982

[54] LATTICE WELDING MACHINE WITH DISC ELECTRODE

[75] Inventors: Gerhard Schmidt; Klaus Ritter; Gerhard Ritter, all of Graz, Austria

[73] Assignee: EVG Entwicklungs- u. Verwertungs-Gesellschaft m.b.H., Graz, Austria

[21] Appl. No.: 157,433

[22] Filed: Jun. 9, 1980

[30] Foreign Application Priority Data

Jun. 12, 1979 [AT] Austria .................... 4184/79

[51] Int. Cl.³ .................... B21F 27/10; B23K 11/06
[52] U.S. Cl. .................... 219/56; 140/112; 219/81
[58] Field of Search .................... 219/56, 81, 58; 140/112

[56] References Cited

U.S. PATENT DOCUMENTS

| | | | |
|---|---|---|---|
| 1,601,927 | 10/1926 | Tobey | 219/81 |
| 3,265,277 | 8/1966 | Backroix | 219/81 |
| 3,798,405 | 3/1974 | Boothe | 219/56 |
| 4,079,223 | 3/1978 | Lee | 219/86.7 |

Primary Examiner—Elliot A. Goldberg
Attorney, Agent, or Firm—Ernest F. Marmorek

[57] ABSTRACT

The invention is concerned with an electrical resistance welding machine for producing a wire lattice by welding together longitudinal and transverse wires at their crossover points. The wires are fed stepwise between at least one pair of electrode devices and means synchronized with the feeding means bring the electrode devices together to clamp the wires at one of the crossover points to allow a welding operation to be effected. At least one of the electrode devices comprises a welding electrode in the form of a circularly cylindrical disc which is fitted to an electrode holder and can be rotated to bring new parts of its peripheral surface into the working position. The axis of the disc is inclined at an acute angle to the axial directions of the longitudinal and transverse lattice wires to provide an improved contact surface between the disc electrode and wires, particularly to avoid any tendency of the transverse wires to be displaced laterally by the contact pressure.

3 Claims, 3 Drawing Figures

LATTICE WELDING MACHINE WITH DISC ELECTRODE

The invention relates to an electrical resistance welding machine for producing a wire lattice by welding together longitudinal and transverse wires at their crossover points, the machine comprising means for feeding the wires stepwise between at least one pair of electrode devices, and means synchronized with the feeding means for bringing the electrode devices together to clamp the wires at one of the crossover points therebetween, at least one of the electrode devices comprising an electrode holder and a welding electrode fitted thereto for transmitting welding current from the electrode holder to the crossover points of the wires in turn.

During spot welding by the electrical resistance method, the contact surfaces of the electrodes touching the material to be welded are very severely worn by the heating occurring during the welding operation and the necessary welding pressure. As soon as the contact surfaces of the electrodes begin to change their shape as a result of the effects of heat and pressure, the transmission of current is no longer effected satisfactorily and faulty welding occurs.

For this reason, the electrodes are frequently provided as electrode holders with electrode tips which can be quickly replaced on the appearance of wear phenomena, as is disclosed in U.S. Pat. No. 2,663,783.

It is further known to construct the welding electrode of a welding machine intended, in particular, for the spot welding of aluminium sheets in the form of a circularly cylindrical disc and to mount this disc electrode on an electrode holder in such a manner that it can be rotated automatically by a stepping mechanism by one angular step after each welding operation, so that during the welding of a row of spots, a different part of the contact surface of the disc electrode comes into contact with the material to be welded each time and so the life of the electrode is lengthened considerably. (See U.S. Pat. No. 4,079,223).

It is also known in lattice welding machines in which the material is advanced at a uniform speed, to construct the electrodes as in seam welding machines in the form of circularly cylindrical rollers which are mounted for free rotation and urged resiliently towards one another, and between which the wires for the lattice to be produced are pulled, the roller electrodes being entrained in rotation by the advancing longitudinal wires of the lattice. In this case, too, different contact surface regions of the electrodes are stressed during the successive spot welding operations (see U.S. Pat. No. 2,487,392). With such lattice welding machines the transverse wires in the vicinity of all cross-over points of the wires must be held in relation to the longitudinal wires so that they are not displaced by the rollers running onto the transverse wire at the crossover points of the wires. In addition, it is necessary, by means of spacers for the electrodes or by timing of the welding currents, to prevent the roller electrodes, which are resiliently urged towards one another, from being short-circuited in the region of the sections of longitudinal wire situated between the crossover points of the wires.

In lattice welding machines with step-by-step wire feed and a synchronized relative movement of the electrodes towards the crossover points of the wires, the use of roller electrodes or of similarly disposed circularly cylindrical non-rolling disc electrodes, would lead to the risk that the lattice wire parallel to the roller axis is displaced in a direction perpendicular to its axial direction under the welding pressure, unless expensive constructional measures are provided to hold the wire in question at all the crossover points. If the connecting line between the wire axis and the axis of the roller or disc deviates even slightly from the direction of pressure of the electrode, then a component of force arises which is directed perpendicular to the axial direction of the wire in question, as a result of which the wire is displaced in a lateral direction.

The object of the invention is to construct an electrode device with an electrode holder fitted with a welding electrode which can be used on a wire lattice electrical resistance welding machine with step-by-step wire feed and synchronized movement of the electrodes, so that the welding electrode has a life which is comparatively as long as that of the roller or disc electrodes already described, but is free of the tendency to displace or misalign one of the wires to be welded at the crossover point of the wires.

According to the invention, this is achieved by constructing the welding electrode in the form of a circularly cylindrical disc which is disposed on the electrode holder for rotation about the axis of the disc and is provided with means for fixing the disc in a selective angular postion relative to the electrode holder, the axis extending at acute angles to the axial directions of the longitudinal and transverse wires.

As a result of the oblique position of the disc electrode with respect to the lattice wires to be welded, the effect is achieved that on a limited transverse displacement of the adjacent lattice wire parallel to itself in the lattice production plane, this wire moves along a generatrix of the disc electrode. Since the distance of this generatrix from the lattice production plane has the same magnitude everywhere, the appearance of a component of force increasing any deviation of the wire from its desired position is avoided.

In a lattice welding machine wherein the transverse wires are supplied alternately above and below the longitudinal wires, the invention may be applied to the welding electrode of both electrode devices of a cooperating pair in order to avoid an unwanted displacement of the transverse wires above and below the longitudinal wires.

But even when longitudinal wires always rest on the lower welding electrodes, it is still advisable to use the disc electrodes in the oblique position according to the invention for the lower electrode devices because a longer life can be achieved. Thus if a disc electrode is used aligned in the manner of a roller with respect to a longitudinal wire, that is with its axis at 90° relatively to the axis of the wire, a groove peripheral is formed by the adjacent longitudinal wire upon wear in contact surface, whereas an oblique groove is formed with an inclined disc electrode. In the latter case, a considerably smaller angular displacement of the disc electrode than in the first case is sufficient to offer an under formed contact surface to the longitudinal wire after local wear of the disc. It follows that inclined disc electrodes can be brought into a considerably greater number of angular positions in which they can be used again as new.

The invention will now be explained in more detail by reference to an embodiment which is illustrated in the accompanying drawings, wherein.

Figure 1:
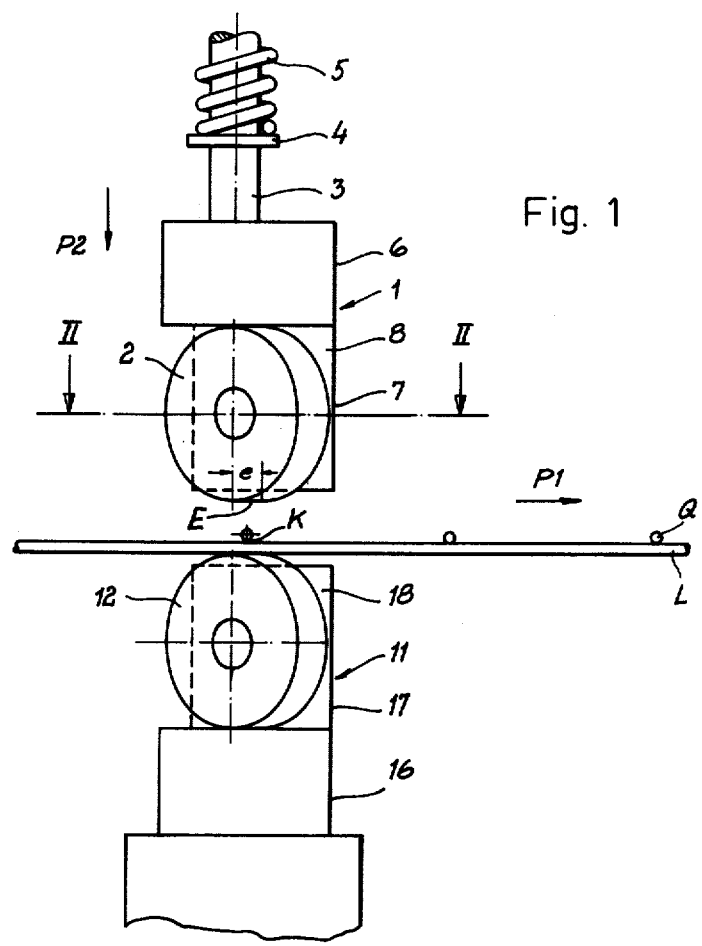
FIG. 1 shows the construction and arrangement according to the invention of two cooperating welding electrode devices on a lattice welding machine, in a diagrammatic side view.

The drawings show part of a lattice welding machine which works with a step-by-step wire feed, each step corresponding to the spacing of adjacent transverse wires, in the direction of the arrow P1. Whenever a crossing point K of a longitudinal wire L and a transverse wire Q is between a pair of cooperating welding electrodes, an adjusting movement of an upper electrode 2 is effected in the direction of the arrow P2 towards the crossover point of the wires supported by a lower electrode 12.

A holder 1 of the upper electrode 2 is carried by a push-rod 3 which is displaceable in a guide (not shown) and which can be urged downwards by means of a compression spring 5 resting on a collar 4 by an electrode beam (not shown) which is common to all the electrodes, to press the electrode 2 against the crossover point of the wires, and can be pulled back again after welding has been effected to lift the electrode 2.

Figure 2:
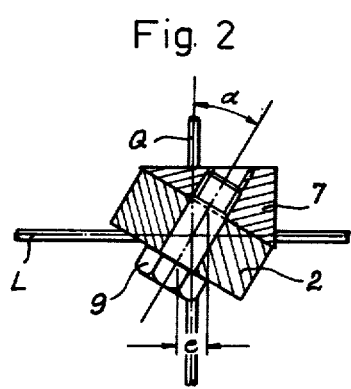
FIG. 2 is a section taken on the line II—II in FIG. 1.

While an upper portion 6 of the electrode holder 1 is made square in the example shown, a lower portion 7 has the shape of a prism with a triangular cross-section, as can be seen, in particular, in FIG. 2. Bearing against an oblique main surface 8 of this prism is the welding electrode 2, which is constructed in the form of a circularly cylindrical disc, and which is fixed by means of a clamping screw 9 engaging in a tapped hole in the lower portion 7 of the holder, in such a position that the middle of the lowest generatrix E of the circularly cylindrical wall of the electrode 2 is in alignment with the axis of the push-rod 3 and the desired position of the associated crossover point K of the wires, determined by the longitudinal and transverse wire feeder. The clamping screws are omitted in FIG. 1 for the sake of simplicity.

As FIG. 1 shows, the projection of the generatrix E on the longitudinal wires corresponds to a distance e; within this distance, each transverse wire Q at a crossover point K could be displaced parallel to itself on the longitudinal wires, without the disc electrode 2 exerting thereon a component of force increasing the unwanted displacement.

In the embodiment illustrated, the upper disc electrode 2 is inclined so that its axis forms an acute angle α of about 30° with the axis of the associated transverse wire Q. This angle can be varied within considerable limits but should preferably be between 30° and 60°. As can immediately be seen from FIG. 2, as the angle becomes smaller, the necessary dimensions of the electrodes in the direction of the transverse wires become smaller so that the electrodes can be brought closer together on the welding line, as is necessary when producing narrow-mesh lattices.

Figure 3:
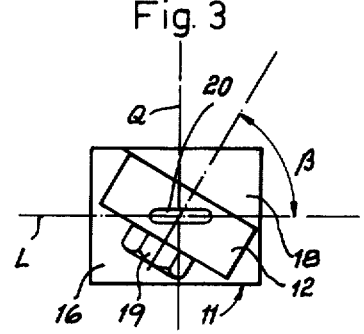
FIG. 3 is a plan of the lower electrode device.

As shown in FIGS. 1 and 3, the lower electrode is similar in construction to the upper electrode, but is mounted with its square portion 16 fixed to a bus bar or the like. All the components of the lower electrode device are designated by the reference numerals of the corresponding components of the upper ,lectrode device, increased by 10. FIG. 3 shows that the axis of the lower disc electrode 12 forms an angle β with the axis of the associated longitudinal wire L, which angle is complementary to the angle α so that the two electrode axes extend parallel to one another and therefore the two disc electrodes 2 and 12 are inclined in the same direction in relation to the longitudinal wires L. An opposite inclination of the two disc electrodes with respect to the longitudinal wires L can equally well be used, however.

In the plan view of FIG. 3, it can be seen that an oblique groove 20 is formed in the contact or generated surface of the lower disc electrode 12 by the longitudinal wire L through wear. Similarly, an oblique groove is formed in the contact surface of the upper disc electrode 2 by the transverse wires Q. As soon as these grooves have reached predetermined dimensions, the clamping screw 9 or 19 is undone and the disc electrode 2 or 12 is turned about its axis through such an angle that the grooved zone is replaced by a closely adjacent contact surface zone which has not yet been worn, after which the clamping screw is tightened again.

We claim:

1. In an electrical resistance welding machine for producing a wire lattice by welding together longitudinal and transverse wires at their crossover points, said machine comprising means for feeding said wires stepwise between at least one pair of electrode devices, and means synchronized with said feeding means for bringing said electrode devices together to clamp said wires at one of said crossover points therebetween, an improved electrode device which comprises an electrode holder, a welding electrode fitted to said electrode holder and adapted to transmit welding current from said electrode holder to said crossover points in turn, said welding electrode being in the form of a circularly cylindrical disc which is disposed on said electrode holder for rotation about the axis of said disc and is provided with means for fixing said disc in a selective angular position relative to said electrode holder, said axis extending at an acute angle to the direction of feed of said longitudinal wires.

2. A machine according to claim 1, wherein said disc axis forms angles selected from the range of 30° to 60° with said axial directions of said longitudinal and transverse lattice wires.

3. A machine according to claim 1 or claim 2, wherein said fixing means holds said disc bearing against an oblique surface of said electrode holder by means of a clamping screw.

* * * * *